US011480206B2

(12) United States Patent
Weber et al.

(10) Patent No.: US 11,480,206 B2
(45) Date of Patent: Oct. 25, 2022

(54) COMPOSITE PANELS ASSEMBLY, FURNITURE COMPRISING SUCH ASSEMBLY AND AIRCRAFT COMPRISING SUCH ASSEMBLY

(71) Applicant: AIRBUS DEFENCE AND SPACE GMBH, Taufkirchen (DE)

(72) Inventors: Markus Weber, Hamburg (DE); Kristian Zimmermann, Munich (DE); Gregor Christian Endres, Pfaffenhofen/Ilm (DE); Christian Schumacher, Colomiers (FR)

(73) Assignee: Airbus Defence and Space GmbH, Taufkirchen (DE)

( * ) Notice: Subject to any disclaimer, the term of this patent is extended or adjusted under 35 U.S.C. 154(b) by 987 days.

(21) Appl. No.: 16/217,630

(22) Filed: Dec. 12, 2018

(65) Prior Publication Data

US 2019/0203751 A1    Jul. 4, 2019

(30) Foreign Application Priority Data

Dec. 19, 2017   (DE) ...................... 10 2017 130 550.5

(51) Int. Cl.
*F16B 5/02*   (2006.01)
*B32B 7/08*   (2019.01)
(Continued)

(52) U.S. Cl.
CPC ................ *F16B 5/02* (2013.01); *B29C 65/56* (2013.01); *B29C 70/24* (2013.01);
(Continued)

(58) Field of Classification Search
None
See application file for complete search history.

(56) References Cited

U.S. PATENT DOCUMENTS 2,383,354 A * 8/1945 Teeter ................. F25D 23/082
                                                    220/592.04
3,578,526 A    5/1971 Harding
(Continued)

FOREIGN PATENT DOCUMENTS

EP     1 719 698 A1    11/2006
EP     2 565 027 A1     3/2013
(Continued)

OTHER PUBLICATIONS

Extended European Search Report for Application No. 18196827.2 dated Apr. 15, 2019.
(Continued)

*Primary Examiner* — Alexander S Thomas
(74) *Attorney, Agent, or Firm* — Jenkins, Wilson, Taylor & Hunt, P.A.

(57) ABSTRACT

A composite panel assembly including a first panel with a first skin, a second skin, a core, and an assembly flange. A second panel includes a first skin, a second skin, a core, and an assembly flange. A fastening device is adapted to fasten the assembly flange of the first panel to the assembly flange of the second panel, wherein the core of one of the first panel or the second panel includes reinforcing pins and a high-density portion placed along the assembly flange.

13 Claims, 3 Drawing Sheets

(51) Int. Cl.
*B64C 1/12* (2006.01)
*B29D 99/00* (2010.01)
*B64C 1/00* (2006.01)
*B64C 3/26* (2006.01)
*B29C 70/24* (2006.01)
*B29C 65/56* (2006.01)
*B32B 5/18* (2006.01)
*B65D 90/08* (2006.01)
*B65D 90/02* (2019.01)
*B64D 11/00* (2006.01)

(52) U.S. Cl.
CPC ............ *B29D 99/0021* (2013.01); *B32B 7/08* (2013.01); *B64C 1/00* (2013.01); *B64C 1/12* (2013.01); *B64C 3/26* (2013.01); *B32B 5/18* (2013.01); *B32B 2479/00* (2013.01); *B32B 2605/003* (2013.01); *B32B 2605/18* (2013.01); *B64C 2001/0072* (2013.01); *B64D 2011/0046* (2013.01); *B65D 90/022* (2013.01); *B65D 90/08* (2013.01)

(56) References Cited

U.S. PATENT DOCUMENTS

| | | | |
|---|---|---|---|
| 5,958,550 | A | 9/1999 | Childress |
| 7,311,216 | B2 * | 12/2007 | Donnelly ............. B65D 90/022 220/1.5 |
| 7,575,194 | B2 | 8/2009 | Brown et al. |
| 9,289,927 | B2 | 3/2016 | Weber et al. |
| 9,469,418 | B1 | 10/2016 | Grillos et al. |
| 2006/0188696 | A1 | 8/2006 | Grose et al. |
| 2015/0273787 | A1 | 10/2015 | Nansen et al. |
| 2017/0320290 | A1 | 11/2017 | Endres et al. |

FOREIGN PATENT DOCUMENTS

| | | |
|---|---|---|
| WO | WO 2005/016643 A1 | 2/2005 |
| WO | WO 2012/028263 A1 | 3/2012 |

OTHER PUBLICATIONS

German Office Action for German Application No. 10 2017 130 550.5 dated Aug. 7, 2018.

\* cited by examiner

COMPOSITE PANELS ASSEMBLY, FURNITURE COMPRISING SUCH ASSEMBLY AND AIRCRAFT COMPRISING SUCH ASSEMBLY

CROSS-REFERENCE TO RELATED APPLICATION

This application claims priority to German Patent Application No. 10 2017 130 550.5 filed Dec. 19, 2017, the entire disclosure of which is incorporated by reference herein.

TECHNICAL FIELD

The disclosure herein relates to composite panels assemblies, furniture comprising composite panel assemblies and vehicles such as aircraft comprising such panel assemblies. The disclosure herein relates more particularly to the junction of composite panels such as sandwich panels, to form a composite panel assembly.

BACKGROUND

Composite panels have the main advantage of being lightweight. Composite called sandwich panels or sandwich construction, having a lightweight core enclosed between two rigid walls or skins are particularly lightweight. They are therefore beneficial in vehicle construction, and particularly in the construction of furniture for vehicles such as galleys for example. Indeed, lightweight equipment onboard a vehicle and more particularly onboard aircraft is a very important factor in reducing the use of fuel in vehicles.

Therefore composite panels assembly has been proposed to create structures and/or furniture for vehicles in general and for aircraft in particular. However composite panels reveal difficult to produce in complex forms and composite panels assemblies often lack the mechanical resistance that the panels have. Given that composite panels are usually produced in generally flat portions, the assembly between two panels happens at a corner or angle between two panels where the transmission of loads is complex. The transmission of loads between two panels assembled together is often not optimal, leading to early fatigue and breakage of the panels or of the assembly. Such mechanical constraints are even more difficult to conciliate with design requirements of the furniture.

WO2005016643 discloses a container comprising a plurality of composite panels assembled together. The panels comprise a thermoplastic core and thermoplastic resin skins. It describes a manufacturing method in which a continuous flat panel is used and thermoformed to create an edge adapted for the attachment of the panel to another panel. The use of thermoplastic reduces greatly the choice of mechanical and chemical properties of the panel. Besides, the connection of the panels reveals to be fragile and subject to rupture under stress and/or repetitive shocks. The container disclose in this document does not have any design requirements and the connection between panels is not adapted to a furniture for receiving clients for example.

U.S. Pat. No. 3,578,526 describes a rotor cap panel of a helicopter with composite panels connected to each other. The panels comprise a honeycomb core contoured by balsa wood, as well as an outer layer to be outside the aircraft and an inner layer. Such panel does not provide optimal mechanical resistance. Besides, such panel connections are not adapted to be used as furniture where design consideration also apply.

These documents do not describe a panel that is lightweight and durable in conditions in which it will be submitted to mechanical stress, shocks, etc. In particular they do not provide a solution that may be used in an assembly for a furniture which also includes design requirements.

SUMMARY

The disclosure herein aims to provide an assembly of composite panels that is lightweight. The disclosure herein also aims to provide an assembly that is durable and which proposes a durable assembly of composite panels, also when submitted to mechanical loads and shocks. The disclosure herein also aims to provide an assembly which can be designed for business conditions such as for receiving clients.

The disclosure herein proposes a composite panel assembly comprising:
  a first panel comprising;
    a first layer forming a first skin,
    a second layer forming a second skin,
    a third layer forming a core, the core being arranged between the first skin and the second skin,
    an assembly flange in which the first layer and the second layer are arranged directly against each other,
  a second panel comprising;
    a first layer forming a first skin,
    a second layer forming a second skin,
    a third layer forming a core, the core being arranged between the first skin and the second skin,
    an assembly flange in which the first layer and the second layer are arranged directly against each other,
  at least a fastening device adapted to fasten the assembly flange of the first panel to the assembly flange of the second panel,
wherein the core of at least one of the first panel or the second panel at least partly comprises reinforcing pins.

The combination of pins in the core material of at least one of the two panels and an assembly flange without core is particularly beneficial to obtain a particularly mechanically resistant assembly of composite panels. The panels comprising reinforcing pins may also be made thinner for an equivalent or higher mechanical resistance to a panel without reinforcing pins. Panels comprising reinforcing pins in the core layer may thus be light and compact although providing a vey good mechanical resistance to an assembly of panels according to the disclosure herein.

Moreover the arrangement of pins in the core may be adapted to provide a smooth transition of mechanical properties from the assembly flange to the rest of the panel. Thereby the transmission of loads between the assembly flange and the rest of a panel is progressive such that the loads may be better transmitted between the assembly flange and the panels.

The subject matter herein thereby discloses a composite panels assembly with a very good mechanical resistance and endurance under repetitive mechanical stress due for example to shocks or structural longitudinal load.

Such composite panel assembly may therefore be used as furniture panels, such as panels for a vehicle's furniture, for example an aircraft cabin monument or galley.

The pins may be dry fiber bundles. The fiber materials used may consist of or comprise, for example, aramid fibers, carbon fibers, nylon fibers, polyester fibers, metal fibers or glass fibers, wherein any other fiber materials can also be utilized. The fiber bundles frequently consist of 12K rovings, i.e., fiber bundles with 12,000 monofilaments. In order to additionally improve the reinforcing effect achieved with the rovings, it would naturally also be possible to utilize rovings with more or less than 12,000 fibers, for example, 24K rovings (24,000 individual fibers) or rovings with even more fibers. Pins and processes for their use in the present disclosure, in particular for their insertion in the core, are described in the document U.S. Pat. No. 9,289,927 of which the content is herein included.

Furthermore, at least some reinforcing pins may be arranged so as to cross the core from the first skin to the second skin.

This provides a core and a panel with a particularly good mechanical resistance. Besides, it allows some transmission of loads between the first panel and the second panel.

Moreover, at least some pins may be arranged at least partially in the first skin and/or in the second skin.

The pins are thus anchored respectively in the first skin and/or in the second skin. Such pins allow transmission of loads between the first panel and the second panel and greatly improve the general resistance of a panel of an assembly according to the disclosure herein.

The core may comprise:
a low-density portion with a first density,
a high-density portion with a second density, the second density being higher than the first density.

The high-density portion of the core may form a reinforcing edge of the core, the reinforcing edge being placed or disposed along the assembly flange.

The high density portion also allows to locally reinforce the core and hence the panel. In particular reinforcing the edges of the core with a high density foam provides a mechanical reinforcement locally while keeping the panel lightweight by using a low-density core in some portion of the panel. It also provides a mechanical resistance transition between the flange and the rest of the composite panel, so that the mechanical resistance does not vary suddenly along the panel.

In a composite panel according to the disclosure herein:
the assembly flange of the first panel may be angled relative to at least another portion of the first panel, and/or
the assembly flange of the second panel may be angled relative to at least another portion of the second panel.

The first panel and the second panel may comprise a panel portion and an assembly flange. The panel portion forms the main portion of the panels. The outer surfaces of the panel portion are generally flat. However in some embodiments, for functional or aesthetic reasons at least one face of the panel portion may be non-flat.

The assembly flange of the first panel may be angled relative to a panel portion of the first panel. Similarly the assembly flange of the second panel may be angled relative to a panel portion of the second panel.

In the first panel and/or in the second panel, an outer face of the first skin in the assembly flange may form an angle of between 120 degrees and 150 degrees with the outer face of the first skin in the panel portion, in particular of between 130 degrees and 140 degrees, for example an angle of about 135 degrees. Thereby when the first panel and the second panel are assembled, the angle between the outer face of the first skin in the panel portion of the first panel and the outer face of the first skin in the panel portion of the second panel may be of about 90 degrees. A 90 degrees junction between two composite panels may be provided by the disclosure herein. In particular, a 90 degrees junction between two composite panels with at least an intermediate portion corresponding to the flange assembly being angled between 120 degrees and 150 degrees with one and the other of the two panels may be provided by the disclosure herein. Therefore an assembly is provided with a 90 degrees connection between two composite panels but with a stepwise angle transition from one panel to another panel. This provide an assembly particularly mechanically resistant and with a good transmission of loads from one panel to the other panel. In particular it ensures that a load may be transmitted between the first panel and the second panel at least along the outer skin of the panels with a minimized shear load of a skin of a panel and a maximal longitudinal load of a skin of a panel.

The first skin and the second skin may form a bevel along the assembly flange.

The bevel is arranged between the panel portion and the assembly flange of the panels. The bevel forms a transition between the panel portion—in which the first skin and the second skin are separate from each other with the core in between—and the assembly flange—in which the first skin and the second skin are directly in contact with each other, with no core in between. In the first panel and/or in the second panel, an outer face of the first skin in the assembly flange may form an angle of between 145 degrees and 168 degrees with the outer face of the first skin in the bevel portion, for example an angle of about 157.5 degrees. Thereby a 90 degrees junction between two composite panels with at least two, and in beneficial embodiments at least three, intermediate portions may be provided by the disclosure herein. This improves the longitudinal transmission of loads in the skin of the panels.

The high-density portion of the core may be arranged at least partially in the bevel formed by the first skin and the second skin.

The first skin and/or the second skin may be reinforced in the bevel portion. The first skin and/or the second skin may be reinforced in the assembly flange.

The first skin and/or the second skin may be thicker in the bevel portion and/or in the e assembly flange. A skin may be reinforced by addition of fiber layers and/or different orientation of fibers.

The high-density portion of the core comprises reinforcing pins.

By reinforcing the high density portion of the foam, the edge of the core may be even more reinforced. Moreover the mechanical properties may be transitioned from the panel portion to the bevel by a low-density core, to a low-density core with reinforcing pins, to a high density core, and to a high density core with reinforcing pins.

The assembly may beneficially comprise a cover element, adapted to be mounted at least partially on at least part of the assembly flange of the first panel and/or at least part of the assembly flange of the second panel.

The cover element may be mounted by elastic deformation onto the assembly, the elastic deformation mounting being sometimes also referred to as a clip-like fastening. In particular, a portion of the cover element may be elastically deformed to be assembled to a panel and/or to a fastening device. The cover element is beneficially mounted so as to be relatively easily removable, for example by hand or with use of a simple tool. It may be removable by elastic deformation.

The cover element may for example be mounted on a screw or a bolt of the fastening device.

The cover element may have a Young modulus lower than that of the skin and/or of the first panel and/or of the second panel.

The cover element may comprise an elastomer.

The cover element is deformable under impact by humans or objects carried by humans. The cover element ensures the same function as a bumper would. The panels are thus protected by such cover element which at least partially absorbs the most common impacts to which composite assembly may be exposed, for example in an aircraft cabin.

The Young module of the panels in the panel portion may be of at least 10.00 MPa. The panels may therefore be used as furniture panels, such as panels for a vehicle's furniture, for example a cabin monument or a galley. The panels may thus be considered rigid under normal use by humans.

Moreover the size and shape of the cover element may be chosen so that the edges of the cover element may be along the surface of one ore more of the panels so as to provide a smooth transition between the external surface of the panels and the external surface of the cover element.

The first panel and the second panel comprise a gusset filler space between an edge of the core and the assembly flange.

More particularly at least one of the first panel and of the second panel comprises a gusset filler space in the bevel between an edge of the core and the assembly flange. The gusset filler permits reducing stress peaks in the ply junctions.

The gusset filler space may be filled with the same material as the foam core material.

The assembly flange of the first panel may comprise at least a through hole.

The assembly flange of the second panel may comprise at least a through hole.

The fastening device may comprise at least a fastener adapted to be arranged simultaneously in the through hole of the first panel and in the through hole of the second panel so as to secure the assembly flange of the first panel with the assembly flange of the second panel.

The fastener may be of different types such as for example a screw, a bolt, a rivet, a pin, etc.

The fastening device may comprise an assembly piece adapted to be fastened to the assembly flange of the first panel and to the assembly flange of the second panel.

The fastening device may in particular comprise an assembly piece. The assembly piece may comprise at least two through holes. A first fastener may be adapted to be arranged simultaneously in the through hole of the first panel and in a first through hole of the assembly piece, and a second fastener may be adapted to be arranged simultaneously in the through hole of the second panel and in a second through hole of the assembly piece. The first panel and the second panel may thus be fastened to each other with their edge abutting to each other so as to ensure a good transmission of longitudinal loads between the two panels.

The disclosure herein also extends to method for manufacturing a composite panel assembly, comprising at least:
preparing a first panel comprising;
  a first layer forming a first skin,
  a second layer forming a second skin,
  a third layer forming a core, the core being arranged between the first skin and the second skin,
  an assembly flange in which the first layer and the second layer are arranged directly against each other,
preparing a second panel comprising;
  a first layer forming a first skin,
  a second layer forming a second skin,
  a third layer forming a core, the core being arranged between the first skin and the second skin,
  an assembly flange in which the first layer and the second layer are arranged directly against each other,
preparing at least a fastening device adapted to fasten the assembly flange of the first panel to the assembly flange of the second panel,
introducing pins in at least part of the core of at least one of the first panel or the second panel.

The disclosure herein also extends to vehicle furniture comprising an assembly according to the disclosure herein, in particular, a cabin monument or galley comprising an assembly according to the disclosure herein.

The disclosure herein also extends to an aircraft comprising an assembly according to the disclosure herein.

BRIEF DESCRIPTION OF THE DRAWINGS

Some specific exemplary embodiments and aspects of the disclosure herein are described in the following description in reference to the accompanying, example figures.

DETAILED DESCRIPTION

Figure 1:
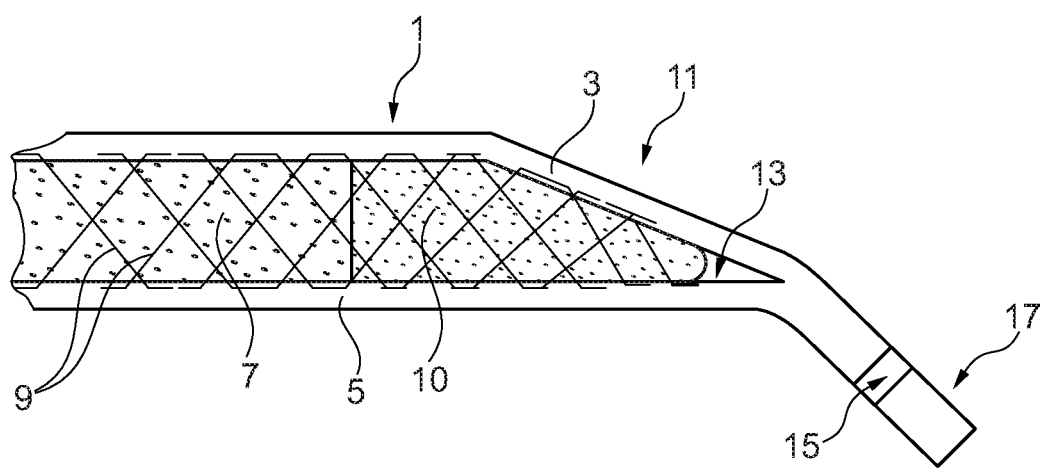
FIG. 1 is a representation of a cross-section of a portion of a composite panel of an assembly embodiment according to the disclosure herein.

In FIG. 1 a portion of a composite panel 1 is represented. The panel comprises a first skin 3 (or outer skin), and a second skin 5 (or inner skin). In between the outer skin 3 and the inner skin 5, is a third layer or core 7.

The outer skin 3 and the inner skin 5 may be made of composite material such as a fiber reinforced material. For example the skin 3, 5 may comprise carbon fiber textiles that are impregnated with a resin.

The core 3 may comprise a lightweight foam including but not limited to PMI based closed cell foam materials.

The core 7 comprises reinforcing pins 9. The reinforcing pins 9 may comprise fibers such as carbon fibers. The reinforcing pins 9 extend beneficially across the thickness of the core 7. In the examples represented in FIGS. 1-5, the reinforcing pins 9 extend into the outer skin 3 and into the inner skin 5, more particularly a first end of a reinforcing pin 9 extends into the outer skin 3 and a second end of the reinforcing pin 9 extend into the inner skin 5. The reinforcing pins 9 are thus anchored in the skins 3, 5. The reinforcing pins 9 reinforce the core of the panel 1, such that the mechanical resistance of the panel is improved.

The panel 1 comprises a panel portion in which the outer skin 3 and the inner skin 5 are substantially parallel to each other, such that the panel forms a planar surface. Only part of the panel portion is represented in the figures.

An edge of the panel 1 comprises an assembly flange 17. In the assembly flange 17 the outer skin 3 and the inner skin 5 are arranged directly against each other, forming one single layer. Such single layer in the assembly flange 17 is particularly robust and adapted for the fastening of the panel to another element, for example to another panel. Indeed the thickness of the outer skin 3 and of the inner skin 5 are here cumulated to form the assembly flange.

The assembly flange 17 comprises a through-hole 15 adapted for the introduction of a fastening elements such as a screw, a bolt, a rivet, a pin, etc.

The assembly flange 17 is angled to the panel portion of the panel 1 with an angle of about 45 degrees.

The assembly flange 17 may be obtained by as integrally manufactured composite part in which plies are draped into with a mold with the required shape.

The thickness of the core 7 diminishes in a bevel 11 of the panel in which the outer skin 3 and the inner skin 5 transition from the panel portion to the assembly flange 17. In the bevel 11, the outer skin 3 is angled compared to its orientation in the panel portion. In the example of FIG. 1, the outer skin 3 portion in the bevel 11 forms with the outer skin 3 portion in the panel portion an angle of about 12.5 degrees. The inner skin 5 on the contrary, keeps the same orientation in the bevel as in the panel portion, such that it is flat.

An edge of the core 7 is situated in the bevel 11. The edge of the core 7 comprises a high-density portion 29 with a higher density than a low-density portion of the core 7 situated in the panel portion. The high-density portion 29 of the core placed in the bevel 11 ensures a high mechanical resistance of the panel, and in particular of the edge of the panel, including the panel portion's edge, the bevel 11, and the assembly flange 17. It also improves the transmission of load between the panel portion and the assembly flange 17. To form the high-density portion 29, a high-density foam may be used, while a low density foam may be used to form the low-density portion 7 of the core.

In the bevel 11, the filler gusset 13 is between an end edge of the core (in particular of the high-density portion 29 of the core) and the joining of the first skin 3 with the second skin 5. The filler gusset 13 may be filled by the same material such as the core.

Moreover, in some embodiments not represented here, the density of reinforcing pins 9 may be varied within the panel. For example, the reinforcing pins 9 density may be higher in proximity to an edge of the core 7 so as to progressively increase the mechanical resistance of the core and thus of the panel in proximity to its edge and in particular in proximity to the assembly flange 17. The presence of reinforcing pins 9 may replace the high-density portion 2 of the core or be used in combination with a core comprising multiple density portions. The reinforcing pins 9 density may also vary within the low-density portion 7 of the core and within the high-density portion 29 of the core so as to provide a smooth transition of mechanical properties between the low-density portion 7 and the high-density portion 29 and between the high-density portion 29 and the assembly flange 17. The panel may comprise at least one portion in the panel portion without reinforcing pins 9.

The outer skin 3 and/or the inner skin 5 may be reinforced in the bevel 11 and/or the assembly flange 17 so as to provide a better mechanical resistance and durability. Indeed the angled portion of furniture is usually submitted to shear stress and therefore the mechanical resistance and load transmission in these angled portions of the panel can be improved by a local reinforcement of the outer skin 3 and the inner skin 5. The outer skin 3 and/or the inner skin 5 may for example be reinforced locally by additional layers of carbon fibers and/or of other types of fibers.

In FIGS. 2, 3, 4 and 5, four different examples of embodiments of panel assembly according to the disclosure herein are represented. Each assembly comprises two panels 1, 2, each panel being similar to the panel described in relation to FIG. 1.

In particular, the second panel 2 also comprises a first skin 4 (or outer skin), and a second skin 6 (or inner skin). In between the outer skin 4 and the inner skin 6 of the second panel 2, is a third layer or core. The core also comprises a low-density portion 8 and a high-density portion 28. The core of the second panel 2 is also reinforced with reinforcing pins 10. And the second panel 2 also comprises a filler gusset between the edge of the high-density portion 28 and the joining of the outer skin 4 and the inner skin 6.

The second panel 2 comprises an assembly flange 18 with a through-hole 16. The assembly flange 18 is also angled at 45 degrees with the panel portion of the second panel 2, such that the assembly of the first panel 1 and the second panel 2 may be made so that an outer surface of the second panel 2 may form an angle of 90 degrees with an outer surface of the first panel 1. That way the disclosure herein provides an assembly at 90 degrees, which is very commonly sought for furniture, with particularly good mechanical characteristics.

The second panel 2 also comprises a bevel 12 between its panel portion and its assembly flange 18. An outer surface of the bevel 12 forms an angle of about 12.5 degrees with the panel portion of the second panel 2 and an angle of about 12.5 degrees with the assembly flange 18.

Figure 2:
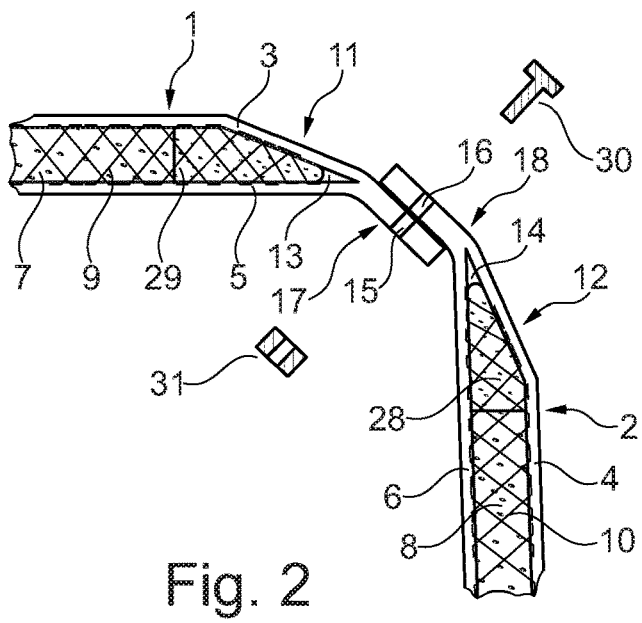
FIG. 2 is a representation of a cross-section of a portion of an assembly embodiment according to the disclosure herein.

In the example of FIG. 2, the second panel 2 may be assembled to the first panel 1 by alignment of at least one of each of their through-holes 15, 16 and introduction of a piece of a fastening device in the through-holes 15, 16. An exemplary fastening device is represented which comprises a screw 30 and bolt 31, the screw 30 being adapted to be introduced in the respective through-holes 15, 16 of the assembly flange 17 of the first panel. The fastening device may however be of different types and comprise a bolt, a screw, a rivet, a pin, etc. (not represented) introduced in the respective through-holes 15, 16 of the assembly flange 17 of the first panel 1 and of the assembly flange 18 of the second panel 2. In this example, the assembly flange of one of the panels is at least partially placed over the assembly flange of the other panel.

Figure 3:
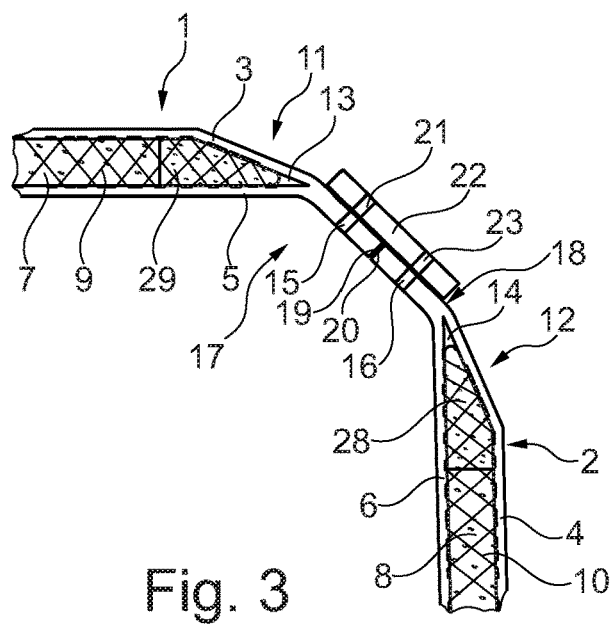
FIG. 3 is a representation of a cross-section of a portion of an assembly embodiment according to the disclosure herein.

In the example of FIG. 3, the fastening device comprises an assembly piece 22. The second panel 2 may be assembled to the first panel 1 through the additional assembly piece 22. The assembly piece 22 is placed on the outer side of the assembly flanges 17, 18 of the first panel 1 and second panel 2. Such position of the assembly piece 22 facilitates the accessibility for assembly and disassembly of the panels. The assembly piece 22 comprises in this example at least two through-holes 21, 23. A first fastener (not represented) may be adapted to be arranged simultaneously in the through hole 15 of the first panel 1 and in a first through hole 21 of the assembly piece 22, and a second fastener (not represented) may be adapted to be arranged simultaneously in the through hole 16 of the second panel 2 and in a second through hole 23 of the assembly piece 22. The first panel 1 and the second panel 2 may thus be fastened to each other with their respective edges 19, 20 abutting to each other so as to ensure a good transmission of longitudinal loads between the two panels.

Figure 4:
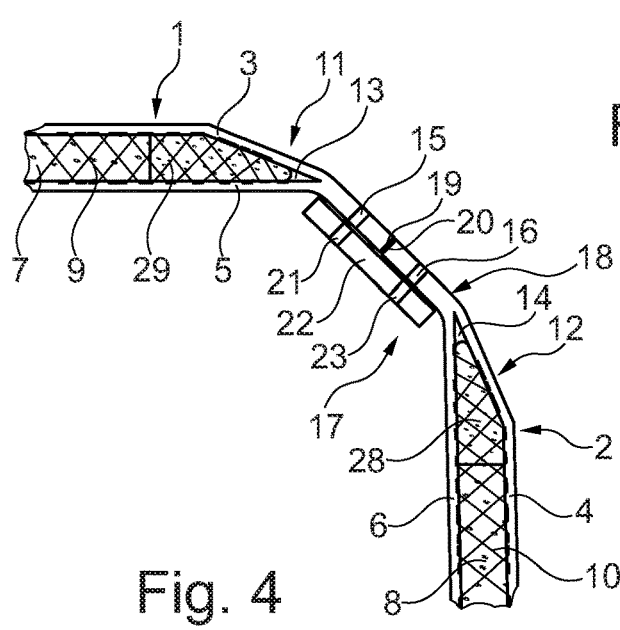
FIG. 4 is a representation of a cross-section of a portion of an assembly embodiment according to the disclosure herein.
Figure 5:
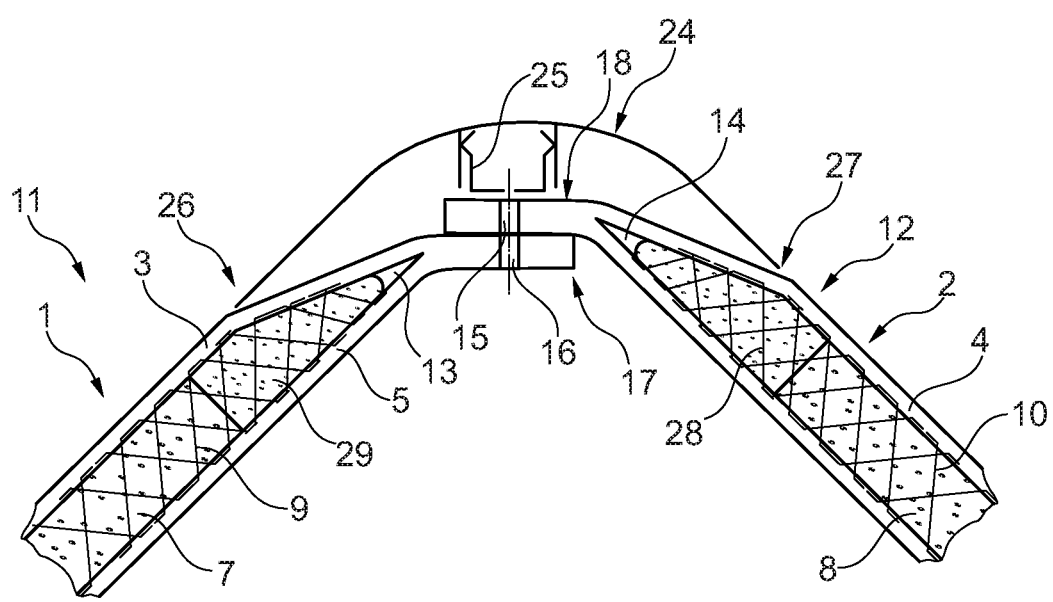
FIG. 5 is a representation of a cross-section of a portion of an assembly embodiment according to the disclosure herein.

The example of FIG. 4 is very similar to the example of FIG. 3, with the difference that the assembly piece 22 is placed on the inner side of the assembly flanges 17, 18. This arrangement may provide a better aesthetic from the outside of the assembly.

In the example of FIG. 3, the first panel 1 is assembled directly to the second panel 2, as described in relation to FIG. 2. This presents the advantage of providing a lighter assembly, which is beneficial for aircraft applications. Moreover, in this embodiment the assembly further comprises a cover element 24.

The cover element 24 permits to render the assembly of the two panel more aesthetic by hiding the assembly flanges 17, 18 and the fastening device. In particular the cover element 24 may have a shape and size adapted to have its edges 26, 27 along a first edge of the bevel 11 so that a smooth transition may be provided between the outer surface of the panel portion of the panels and the cover element 24.

Moreover, the cover element 24 is beneficially elastic so that it may absorb shocks before they are transmitted to the panels 1, 2 and in particular to the assembly of the panels. The cover element 24 may therefore act as a bumper. The cover element 24 may comprise an elastomer.

The cover element 24 may be mounted by elastic deformation onto the assembly. In particular a mounting portion 25 of the cover element 25 may be elastically deformed to be assembled to a fastener (not represented) such as a screw, a bolt, a rivet, a pin, etc. which is introduced in the through-holes 15, 16 of the first panel 1 and second panel 2.

The disclosure herein is not limited to the specific embodiments herein disclosed as examples. The disclosure herein also encompasses other embodiments not herein explicitly described, which may comprise various combinations of the features herein described.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A composite panel assembly comprising:
   a first panel comprising:
      a first layer forming a first skin;
      a second layer forming a second skin;
      a third layer forming a core, the core being between the first skin and the second skin; and
      wherein the first layer, the second layer, and the third layer are arranged to form a panel portion in which the first skin and the second skin are substantially parallel to each other with the core in between, an assembly flange in which the first skin and the second skin are directly against each other, and a bevel portion formed in a transition between the panel portion and the assembly flange;
      wherein an outer face of the first skin in the assembly flange forms an angle of between 145 degrees and 168 degrees with the outer face of the first skin in the bevel portion; and
      wherein the outer face of the first skin in the assembly flange forms an angle of between 120 degrees and 150 degrees with the outer face of the first skin in the panel portion;
   a second panel comprising:
      a first layer forming a first skin;
      a second layer forming a second skin;
      a third layer forming a core, the core being between the first skin and the second skin; and
      wherein the first layer, the second layer, and the third layer are arranged to form a panel portion in which the first skin and the second skin are substantially parallel to each other with the core in between, an assembly flange in which the first skin and the second skin are directly against each other, and a bevel portion formed in a transition between the panel portion and the assembly flange;
      wherein an outer face of the first skin in the assembly flange forms an angle of between 145 degrees and 168 degrees with the outer face of the first skin in the bevel portion; and
      wherein the outer face of the first skin in the assembly flange forms an angle of between 120 degrees and 150 degrees with the outer face of the first skin in the panel portion;
   at least a fastening device configured to fasten the assembly flange of the first panel to the assembly flange of the second panel;
   the core of at least one of the first panel or the second panel at least partly comprising reinforcing pins;
   the core comprising:
      a low-density portion with a first density; and
      a high-density portion with a second density, the second density being higher than the first density; and
      the high-density portion of the core forming a reinforcing edge of the core, the reinforcing edge being along the assembly flange.

2. The assembly according to claim 1, wherein at least some reinforcing pins are arranged to cross the core from the first skin to the second skin.

3. The assembly according to claim 1, wherein at least some pins are arranged at least partially in the first skin and/or in the second skin.

4. The assembly according to claim 1, wherein the high-density portion of the core is at least partially in the bevel portion formed by the first skin and the second skin.

5. The assembly according to claim 1, wherein the first skin and/or the second skin is reinforced in the bevel portion.

6. The assembly according to claim 1, wherein a density of the reinforcing pins varies.

7. The assembly according to claim 1, wherein a density of the reinforcing pins is higher in proximity to a reinforcing edge of the core.

8. The assembly according to claim 1, wherein the high-density portion of the core comprises reinforcing pins.

9. The assembly according to claim 1, wherein a density of the reinforcing pins varies within the low-density portion of the core.

10. The assembly according to claim 1, wherein a density of the reinforcing pins varies within the high-density portion of the core.

11. The assembly according to claim 1, comprising a cover element, configured to be mounted at least partially on at least part of the assembly flange of the first panel and/or at least part of the assembly flange of the second panel.

12. The assembly according to claim 11, wherein the cover element comprises an elastomer.

13. The assembly according to claim 1, wherein the fastening device comprises:

an assembly piece configured to be fastened to the assembly flange of the first panel and to the assembly flange of the second panel; and
at least one fastener adapted to fasten the assembly flange of the first panel and the assembly flange of the second panel to the assembly piece.

* * * * *